(12) United States Patent
Gupta et al.

(10) Patent No.: US 8,326,780 B2
(45) Date of Patent: Dec. 4, 2012

(54) SMOOTHED SARSA: REINFORCEMENT LEARNING FOR ROBOT DELIVERY TASKS

(75) Inventors: Rakesh Gupta, Mountain View, CA (US); Deepak Ramachandran, Champaign, IL (US)

(73) Assignee: Honda Motor Co., Ltd., Tokyo (JP)

( * ) Notice: Subject to any disclaimer, the term of this patent is extended or adjusted under 35 U.S.C. 154(b) by 550 days.

(21) Appl. No.: 12/578,574

(22) Filed: Oct. 13, 2009

(65) Prior Publication Data
US 2010/0094786 A1    Apr. 15, 2010

Related U.S. Application Data

(60) Provisional application No. 61/196,040, filed on Oct. 14, 2008.

(51) Int. Cl.
*G06F 15/18* (2006.01)
(52) U.S. Cl. ............... 706/14; 706/46; 706/47; 706/52; 706/62; 706/16
(58) Field of Classification Search .................. None
See application file for complete search history.

(56) References Cited

U.S. PATENT DOCUMENTS

| | | | |
|---|---|---|---|
| 5,586,218 A | 12/1996 | Allen | |
| 5,946,673 A | 8/1999 | Francone et al. | |
| 2002/0169733 A1* | 11/2002 | Peters, II | 706/45 |
| 2002/0198854 A1 | 12/2002 | Berenji et al. | |
| 2004/0073764 A1 | 4/2004 | Andreasson | |
| 2004/0162638 A1 | 8/2004 | Solomon | |
| 2005/0245303 A1* | 11/2005 | Graepel et al. | 463/1 |
| 2006/0195409 A1* | 8/2006 | Sabe et al. | 706/16 |
| 2006/0200333 A1 | 9/2006 | Dalal et al. | |
| 2007/0192910 A1 | 8/2007 | Vu et al. | |
| 2007/0203862 A1* | 8/2007 | Sekiai et al. | 706/16 |
| 2008/0319929 A1* | 12/2008 | Kaplan et al. | 706/14 |
| 2009/0099985 A1* | 4/2009 | Tesauro et al. | 706/12 |
| 2010/0070439 A1* | 3/2010 | Takeuchi et al. | 706/12 |
| 2010/0257866 A1* | 10/2010 | Schneegass et al. | 60/773 |

FOREIGN PATENT DOCUMENTS

WO    WO 2004/012106    2/2004

OTHER PUBLICATIONS

Klein, "Lecture 13: Reinforcement Learning", UC Berkeley, 2007, 4 pages.*

(Continued)

*Primary Examiner* — Omar Fernandez Rivas
(74) *Attorney, Agent, or Firm* — Fenwick & West LLP; Mark E. Duell (57) ABSTRACT

The present invention provides a method for learning a policy used by a computing system to perform a task, such delivery of one or more objects by the computing system. During a first time interval, the computing system determines a first state, a first action and a first reward value. As the computing system determines different states, actions and reward values during subsequent time intervals, a state description identifying the current sate, the current action, the current reward and a predicted action is stored. Responsive to a variance of a stored state description falling below a threshold value, the stored state description is used to modify one or more weights in the policy associated with the first state.

34 Claims, 5 Drawing Sheets

OTHER PUBLICATIONS

Taylor et al., "Comparing evolutionary and temporal difference methods in a reinforcement learning domain", Proceedings of the genetic and evolutionary computation conference, 2006, 8 pages.*

Reiforcement Learning: A Survey, Journal of Artificial Intelligence Research, 1996, pp. 237-285.*

Arras, K.O. et al., "Hybrid, High-Precision Localisation For The Mail Distributing Mobile Robot System MOPS," *Proceedings of the IEEE International Conference on Robotics and Automation (ICRA)*, May 1998, pp. 3129-3134.

Gerkey, B.P. et al., "The Player/Stage Project: Tools for Multi-Robot and Distributed Sensor Systems," *in Proceedings of the 11th International Conference on Advanced Robotics (ICAR)*, 2003, pp. 317-323, Coimbra, Portugal.

Koenig, S. et al., "Xavier: A Robot Navigation Architecture Based on Partially Observable Markov Decision Process Models," *in Artificial Intelligence Based Mobile Robotics: Case Studies of Successful Robot Systems*, 1998, pp. 91-122, R.B.D. Kortenkamp and R, Murphy, Eds., MIT Press.

Montemerlo, M. et al., "FastSLAM: A Factored Solution to the Simultaneous Localization and Mapping Problem," *in Proceedings of the AAAI National Conference on Artificial Intelligence*, 2002, pp. 593-598.

Ng, A. Y. "Pegasus: A Policy Search Method for Large MDPS and POMDPS," *in Proceedings of the Sixteenth Conference on Uncertainty in Artificial Intelligence*, 2000, pp. 406-415.

PCT International Search Report and Written Opinion, PCT Application No. PCT/US2009/060567, Nov. 25, 2009, 8 pages.

Peters, J. et al., "Reinforcement Learning for Humanoid Robotics," Humanoids2003, *Third IEEE-RAS International Conference on Humanoid Robots*, Sep. 29-30, 2003, Karlsruhe, Germany, 20 pages.

Pineau, J. et al., "Towards Robotic Assistants in Nursing Homes: Challenges and Results," *Robotics and Autonomous Systems*, 2003, vol. 42, No. 3-4, pp. 271-281.

Ramachandran, D. et al., "Smoothed Sarsa: Reinforcement Learning for Robot Delivery Tasks," *IEEE International Conference on Robotics and Automation*, May 12-17, 2009, pp. 2125-2132, Kobe, Japan.

Schmidt-Rohr, S.R. et al., "Human and Robot Behavior Modeling for Probabilistic Cognition of an Autonomous Service Robot," *in the 17th IEEE International Symposium on Robot and Human Interactive Communication (RO-MAN)*, Aug. 2008, pp. 635-640.

Schmidt-Rohr, S.R. et al., "Reasoning for a Multi-Modal Service Robot Considering Uncertainty in Human-Robot Interaction," ACM/IEEE International Conference on Human-Robot Interaction, Mar. 12-15, 2008, Amsterdam, The Netherlands, 6 pages.

Simmons, R. et al., "Probabilistic Robot Navigation in Partially Observable Environments," *in Proceedings of the International Joint Conference on Artificial Intelligence (IJCAI)*, 1995, pp. 1080-1087.

Smart, W.D. et al., "Effective Reinforcement Learning for Mobile Robots," *in Proceedings of the IEEE Conference on Robotics and Automations*, 2002, 7 pages.

Spaan, M.T.J. et al., "A Point-Based POMDP Algorithm For Robot Planning," *in Proceeding of the IEEE International Conference on Robotics and Automation (ICRA)*, Apr. 2004, New Orleans, Louisiana, USA, 6 pages.

Sutton, R. et al., "Reinforcement Learning: An Introduction," 1998, The MIT Press, Thomas Dietterich, Ed., Cambridge, MA, USA, one hundred seventy-one pages.

Theocharous, G. et al., "Approximate Planning in POMDPS with Macro-Actions," *Advances in Neural Information Processing Systems (NIPS)*, 2004, vol. 16, eight pages.

Walsh, T.J. et al., "Planning and Learning in Environments with Delayed Feedback," *in Proceedings of the 18th European Conference on Machine Learning*, 2007, pp. 442-453, Warsaw, Poland.

* cited by examiner

SMOOTHED SARSA: REINFORCEMENT LEARNING FOR ROBOT DELIVERY TASKS

RELATED APPLICATIONS

This application claims priority, under 35 U.S.C. §119(e), from U.S. provisional application No. 61/196,040, filed on Oct. 14, 2008, which is incorporated by reference herein in its entirety.

FIELD OF THE INVENTION

This invention relates generally to decision making by mobile robots, and more particularly to a reinforcement learning process which delays a reinforcement step until uncertainty in a state estimate is reduced.

BACKGROUND OF THE INVENTION

Mobile robots have been deployed in multiple types of environments, including environments having one or more people, such as offices and hospitals, to provide assistance in home, office and medical environments. However, to provide this assistance, mobile robots should plan efficient sequences of actions for performing tasks. Additionally, to most effectively provide assistance, sequence planning needs to be able to quickly respond to dynamic addition of new tasks or changes in the environment surrounding the mobile robot.

In particular, mobile robots often need to dynamically plan an action sequence for delivering an object to a person or location. Conventional methods for planning a delivery, or similar, task construct a policy for performing the task identifying which action to take at different states that arise, or may arise, during operation of the mobile robot using a Partially Observable Markov Decision Process (POMDP). Typically, the policy constructed by a POMDP maximizes a utility criterion, such as expected total reward, or minimizes an expected time for task completion. A policy may be manually encoded, but manual encoding limits the number of tasks described by the policy and makes modification of the policy to account for new tasks or environmental changes difficult.

Because of the limitations of manual encoding, policies for complex tasks involving decision making are usually generated by reinforcement learning, where actions taken at different states are optimized through trial and error. One method for reinforcement learning is State-Action-Reward-State-Action ("SARSA"), which learns a Q function approximating the value of an action taken at a state. The values of the Q function, or "Q values," represent the sum of rewards for states in future time intervals, of "future states," attenuated by the time.

However, because SARSA relies on the future reward from the next time interval when computing the Q value for the current time interval, uncertainty in determining the next state impairs the accuracy of a Q value. For example, when the relevant entities of the next state have not been observed, errors are introduced into the future reward from the next time interval, creating inaccuracies in the computed Q value. Thus, uncertainty in estimating the state during the next time interval causes inaccurate calculation of the Q value for the current state, reducing the accuracy of the generated policy which impairs task performance by the mobile robot.

Hence, there is a need for a system for reducing the effect of uncertainty in state observations in reinforcement learning.

SUMMARY OF THE INVENTION

The present invention provides a system and method for learning a policy for task performance used by a computing system. During a first time interval, the computing system determines a first state, a first action and a first reward value. A policy comprising a plurality of weights, properties of one or more actions and properties of one or more states is used by the computing system to determine a second action associated with a second time interval, the interaction of the second action with an environment surrounding the computing system probabilistically determining a second state, and a first state description including the first state, first action, first reward value and second action is stored. A stored state description associated with a third time interval which occurs after the first time interval and before the second time interval is retrieved and the stored state description is updated based on data obtained by the computing system after the third time interval. Responsive to the variance associated with the stored state description falling below a threshold value, a backup target is calculated from the stored state description and used to modify one or more weights in the policy that are associated with the first state.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
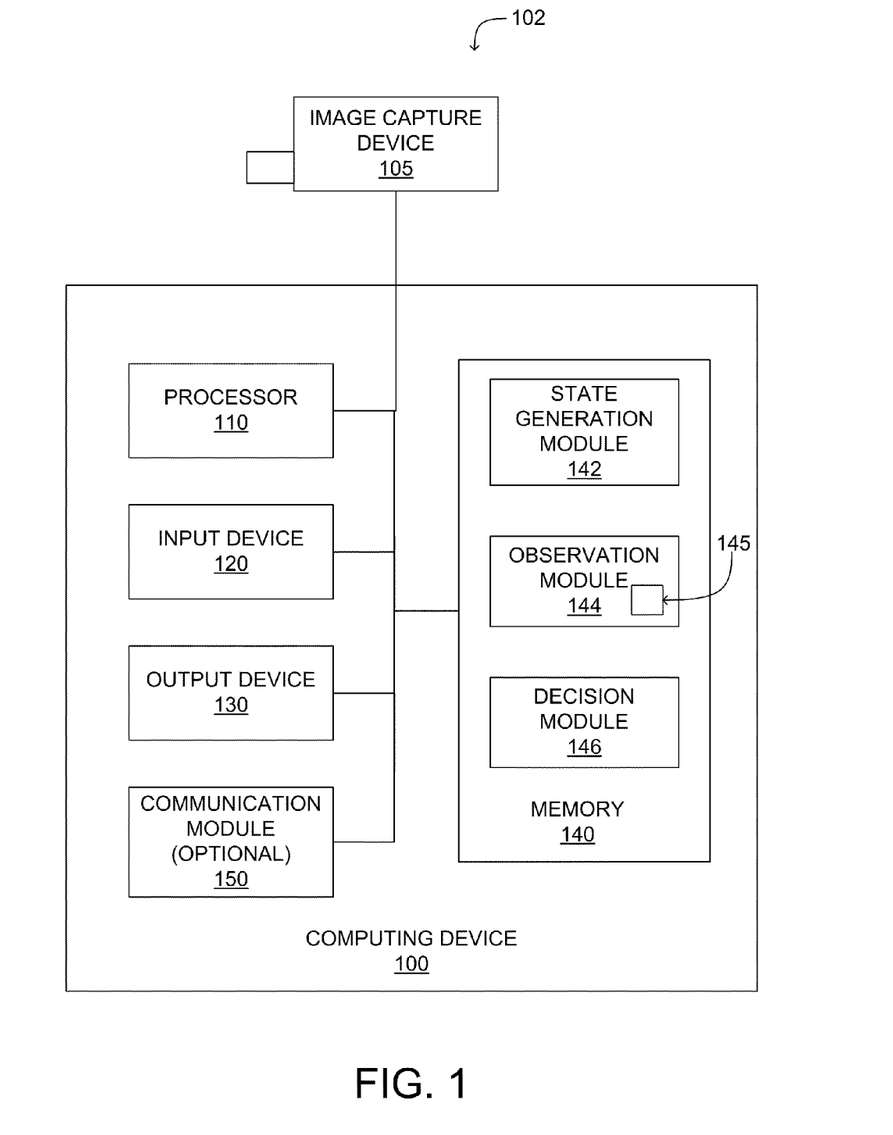
FIG. 1 is an illustration of a computing system in which one embodiment of the present invention operates.

FIG. 1 is an illustration of a computing system 102 in which one embodiment of the present invention may operate. The computing system 102 includes a computing device 100 and an image capture device 105. The computing device 100 comprises a processor 110, an input device 120, an output device 130 and a memory 140. In an embodiment, the computing device 100 further comprises a communication module 150 including transceivers or connectors.

An image capture device 105, such as a video camera, video capture device or another device capable of electronically capturing movement, captures data, such as image or other positional data, describing the movement of an entity, such as a person, and transmits the captured data to the computing device 100. In an embodiment, the image capture device 105 is a combined depth/vision camera apparatus where the depth apparatus captures the presence and coordinates of entities in the visual field of the image capture module 105 and the vision apparatus distinguishes between different entities observed by the image capture device 105. In one embodiment, the image capture device 105 distinguishes people from other types of detected entities using depth information from the depth apparatus, or communicating depth information to the processor 110 to build horizontal and vertical contour lines of continuous depth. The horizontal and vertical contour lines are used as features for a person recognizer described in the memory 140 which is trained using logistic regression to return the maximum likelihood estimate of the coordinates of a person observed by the image capture device 105. Although described above with reference to detecting a person, data from the depth apparatus may also be used to recognize other types of entities. In an embodiment, the vision apparatus is used to distinguish between individual people and objects, for example, by using clothing color to distinguish between different people. The captured image data is communicated from the image capture device 105 to the computing device 110, which processes the captured image data to track one or more entities.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing device 100 such as, a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or another non-volatile storage device, combinations of the above, or some other memory device known in the art. The memory 140 is adapted to communicate with the processor 110, the input device 120, the output device 130 and/or the communication module 150. In one embodiment, the memory comprises a state generation module 142, an observation module 144 and a decision module 146.

The state generation module 142 includes information describing generation and modification of a belief space describing the environment surrounding the computing system 102 using one or more belief states. In one embodiment, the belief space comprises belief states describing a Dynamic Bayesian Network (DBN) representing the location of entities, such as objects or people, as well as the pose associated with the computing system 102, determined by the observation module 144, further described below, and a transition model describing movement of the computing system 102 between states. The location of an entity within a state is modeled using a two-layer representation including a region variable and a position variable. An entity location in a belief state is initially specified by a region, and then more precisely identified by a position, such as a Cartesian coordinate, within the specified region. For example, the region is a discrete variable indicating the approximate location of an entity. There are a small number of regions, each describing a prior distribution over the precise position of the entity. Hence, the region describes a probability distribution from with the position variable is drawn. For example, the position variables are a linear Gaussian conditional on the discrete region variable. In an embodiment, the generated regions correspond to locations in an environment where people or entities typically reside for an extended period of time, such as the area in front of a desk, the area in front of a printer, the area in front of a water cooler or similar locations.

In addition to describing regions and positions, the state generation module 142 also includes a transition model describing motion of an entity between different regions and between different positions within a region. A transition of an entity from a first region to a second region represents movement of the entity from the first region to the second region, for example a person moving from an office to a water cooler. Similarly, when an entity transitions from a first region to a second region, the transition model determines a position of the entity in the second region using parameters associated with the second region. For example, if an entity is in a first region during a first time interval and transitions into a second region during a second time interval, the position of the entity within the second region is determined using the distribution of positions in the second region during the first time interval. During each time interval, the probability of an entity transitioning between regions is small Transitions between positions represent movement of an entity within a region, such as a person moving in an office chair or moving around a desk. In an embodiment, the transition model models the behavior of position variables within a region using Brownian motion which is implemented so that over time, and in the absence of a transition between regions, the distribution of motion reverts to the prior distribution for the region. For example, transitions between positions are modeled assuming a Gaussian kernel density with a small base relative to the scale of the region around the current position. Therefore, the Brownian motion represents movement of the entity to a variety of locations within the region.

The observation module 144 determines the position of the computing system 102 using a localization process. In one embodiment, the observation module 144 describes a modified form of Monte Carlo localization where particle filters maintain an estimate of the path taken by the computing system 102 through an environment, such as the FastSLAM process described in "A Factored Solution to the Simultaneous Localization and Mapping Problem" by M. Montemerlo et al. in Proceedings of the AAAI National Conference on Artificial Intelligence, which is incorporated by reference herein its entirety. In an embodiment, the observation module 144 receives input from one or more sensors (not shown) and generates an $(x, y, \theta)$ tuple using the localization process. In an embodiment, the pose associated with the computing system 102 is used to translate relative coordinates from the sensors into the absolute coordinates included in the $(x, y, \theta)$ tuple.

In one embodiment, the observation module 144 includes a tracking module 145 which tracks the posterior distribution of entity locations in the environment surrounding the computing system 102. For example, the tracking module 145 describes a region based particle filter where particles including a region variable and a position variable are updated at various time intervals. In an embodiment, a particle also includes the values of the included region variable during earlier time intervals, enabling the particle to maintain a history of the region variable identifying regions previously including the entity. During each time interval, the tracking module 145 individually applies the transition model from the state generation module 142. If application of the transition model causes a particle to move from a first region to a second region, the distribution of the second region in the prior time interval is used to sample the position of the particle in the current time interval. After application of the transition model, an observation model is applied to different particles to reweight each particle by the conditional likelihood of the current observation given a particle's position. An example of application of an observation model to a particle is described in U.S. patent application Ser. No. 12/249,849, which is incorporated by reference herein in its entirety. Hence, the observation model allows computation of a weight for each particle indicating the probability of the current observation based on the hypothesis that the entity is at a position and region specified by a particle.

After computing the particle weights, the observation module 144 creates a new particle set by sampling the set of particles from the prior time interval in proportion to the weight of each particle. The sampling is performed on a per-region basis so that the number of particles in a region equals the total weight of that region to regulate the probability mass associated with each region. Because the transition model regulates shifting of probability mass between regions, estimates of the discrete probabilities for region variables are highly accurate, even when the probabilities of position variables are uncertain. The improved accuracy of the region variables increases the accuracy of planning methods using region variables for decision making.

The decision module 146 receives data from the state generation module 142 and the observation module 144 to make decisions about how the computing system 102 performs one or more tasks. In an embodiment, the decision module 146 uses a Partially Observable Markov Decision Process ("POMDP") for decision making Generally, a Markov Decision Process ("MDP") provides a mathematical framework for decision making in a stochastic environment using a tuple of the form (S, A, T, γ, R), where:
S=the set of possible states;
A=the set of possible actions;
T=S×A×S→[0,1], which determines the state transition probabilities;
γ∈[0,1]=a discount factor; and
R=S×A→R, which is the reward function Using the MDP, the decision module 146 generates a stationary policy, π, mapping actions to states. Using the symbols described the MDP above, the stationary policy is represented as π: S→A. Additionally, the stationary policy has a value at different states within the set of possible states. As used herein, "s" denotes a set from the set of possible sets, S, so that s∈S, and $T(s_i, \pi(s_i), s_{i+1})$ is probability of transitioning from state $s_i$ to state $s_{i+1}$ under the effect of an action specified by $\pi(s_i)$. At a specific state, s, within the set of possible states, S, the policy has a value denoted by $V^\pi(s)$. For a state, $s_1 \in S$, the value of the policy, $V^\pi(s_1)$ is described by:

$$V^\pi(s_1) = E_{s_1, s_2, \ldots} [R(s_1) + \gamma R(s_2) + \gamma^2 R(s_3) + \ldots | \pi]$$

In the above description of $V^\pi(s_1)$, $R(s_n)$ denotes the reward function of state $s_n$ and E[ ] represents the expected value. Hence, the value of the policy at state $s_1$ is the expected value of the sum of the reward function for different states within S after attenuating the value of the reward function for states later than state $s_1$ using the discount factor, γ. Using data from the state generation module 142, observation module 144 and tracking module 145, the decision module 146 determines an optimal policy, π*, where the policy value for each state is maximized. In determining the optimal policy, the decision module uses an auxiliary Q-function, described as:

$$Q^\pi(s_t, a_t) = R(s_t) + \gamma E_{s_{t+1} \sim T(s_t, a_t)}[V^\pi(s_{t+1})]$$

Where $R(s_t)$ is the reward function for state s at time interval t ($s_t$). Thus, at a time interval, t, the Q value of the state at time t ($s_t$) and the action at time t ($a_t$) is the sum of the reward function of the current state at the current time interval ($s_t$) added to the expected value of the policy at a state in the next consecutive time interval ($s_{t+1}$), determined by the state transition probabilities (T), attenuated by the discount factor.

The maximum Q-function value for each state, indicated herein as Q*, is the maximum Q-function value for each state and allows determination of the optimal policy, π* by:

$$\pi^*(s) = \underset{a \in A}{\operatorname{argmax}} Q^\pi(s, a)$$

The optimal policy, π*, identifies the action to be taken in the current state by determining the maximum Q-function for an action, a, executed in a state, s. In an embodiment, the decision module 146 uses reinforcement learning to determine the optimal policy by observing a sequence of states visited by the computing system 102, the actions performed by the computing system 102 in different states and the reward for executing an action in a state to determine the optimal policy, or a policy similar to the optimal policy.

To simplify determination of the optimal Q*, the decision module 146 uses a parameterized representation of the Q-function, which is:

$$Q(s, a) \approx \sum_{i=1}^{n} w_i \phi_i(s, a) = w \cdot \phi(s, a)$$

In the parameterized representation of the Q-function, $\phi = \phi_1, \phi_2 \ldots \phi_n$, which is a vector of fixed feature functions, and $w = w_1, w_2 \ldots w_n$, which is a vector of weights. The feature functions comprising φ encode properties of the state and action relevant to determining the Q value, and are dependent on the tasks described by the belief space. For example, for a delivery task, the distance to different regions or the total probability of an object being included in a region comprise the feature function. Using the parameterized representation of the Q-function allows the decision module 146 to determine the optimal policy, π*, from a weighted sum of feature functions. Hence, determining a set of optimal weights, w*, allows the decision module 146 to determine Q*(s,a) for various states in the set of possible states, S, and actions in the set of possible actions, A.

However, because the decision module 146 receives data describing the current state from the state generation module 142, observation module 144 and tracking module 145, the decision module 146 may not have direct knowledge about the current state at the current time interval. For example, the decision module 146 receives a belief distribution about the location of entities involved in a task, rather than a precise location of entity location, from the observation module 144. When partial information about the state of the computing system 102 at a current time interval is received, the decision module 146 uses a Partially Observable Markov Process ("POMP") for decision making The POMP is represented by a tuple of the form (S, B, A, T, γ, R), where:
S=the set of possible states;
B=a set of belief states, each comprising a distribution over the set of possible states, S;
A=the set of possible actions;
T=S×A×S→[0,1], which determines the state transition probabilities;
γ∈[0,1]=a discount factor; and
R=S×A→R, which is the reward function
When the decision module 146 uses a POMP for decision making, the stationary policy, π, maps belief states to actions, so the policy is represented as π: B→A.

To determine an optimal policy using a POMP, the decision module 146 defines Q-functions over the set of belief states, B, rather than over a set of states, S. For every belief state in the set of belief states, B, a Q-function is defined as:

$$Q^\pi(b_t, a) = E_{s_t \sim b_t}[Q^\pi(s_t, a)]$$
$$= R(b_t, a) + \gamma E_{b_{t+1} \sim T(b_t, a, \cdot)}[V^\pi(b_{t+1})]$$

Where $R(b_t, a)$ is the reward function for the pairing of belief state b and action a at time t. Thus, at a time interval, t, the Q value of the belief state at time interval t ($b_t$) and the action at time t (a) is the sum of the reward function of the current belief state and action at the current time interval ($R(b_t, a)$) added to the expected value of the policy at a belief state in the next consecutive time interval ($b_{t+1}$) determined by the belief state transition probabilities (T), attenuated by the discount factor. So, the optimal policy is determined by identifying the pairing of belief state and action that produces the maximum Q value for a belief state, which indicates the action to perform while the computing system is in the belief state.

Similar to determining the optimum policy when an MDP is used, in one embodiment, the decision module 146 uses a parameterized form of the Q-function to determine the optimal policy when a POMDP is used for decision making. The parameterized form of the Q-function represents the Q-function as a weighted sum of feature functions, so that determining an optimal vector of weights allows determination of the optimal Q-function. The parameterized form of the Q-function for the POMP is:

$$Q^*(b,a) = E_{s\sim b}[Q^*(s,a)] = w^* \cdot E_{s\sim b}[\phi(s,a)] = w^* \cdot \phi(b,a)$$

Therefore, the optimal policy, $\pi^*$, is recovered from the parameterized form of the Q-function by solving:

$$\pi^*(b) = \arg\max_a Q^*(b,a) = \arg\max_a [w^* \cdot \phi(b,a)]$$

In an embodiment where the set of possible actions, A, is finite, the maximum value for the weights, w, is able to be efficiently evaluated. For example, when the set of possible actions, A, includes a finite number of actions having a limited number of parameters, the optimal policy is able to be efficiently computed from the parameterized form of the Q-function. Determination of the optimal policy is further described below in conjunction with FIGS. 3 and 4.

In an embodiment, the computing device 100 further comprises a communication module 150 which links the computing device 100 to a network (not shown), or to other computing devices 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing devices 100 for distribution of files and information. In another embodiment, the communication module 150 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 142, 144, 146) can be positioned in close proximity to each other while in other embodiments these components can be positioned in geographically distant locations. For example the units in memory 140 can be programs capable of being executed by one or more processors 110 located in separate computing devices 100.

Figure 2:
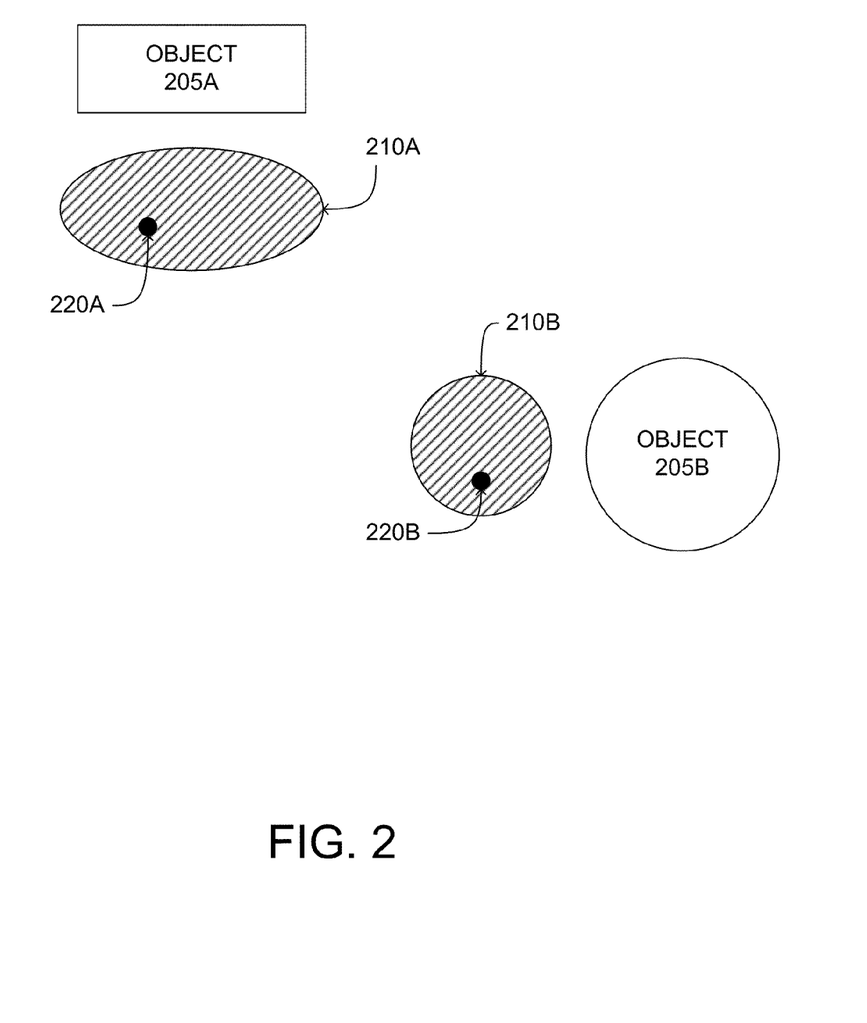
FIG. 2 is an example of a region-based representation of an environment according to one embodiment of the present invention.

FIG. 2 is an example of a region-based representation of an environment according to one embodiment of the present invention. In an embodiment, the computing system 102 is initially configured with the floor plan of the environment surrounding the computing system 102 describing the location of different objects, such as walls, doors, desks, chairs and other objects. For example, the floor plan of an office describing the relative location of different rooms and objects in each room of a building is initially stored in the state generation module 142 of the computing system 102. In addition to initially receiving a description of the surrounding environment, the computing system 102 also receives data describing the possible locations of entities in the environment. For example, the computing system 102 receives data describing the likelihood of entities being proximate to different objects in the environment. In one embodiment, these initial approximations assign an equal likelihood of an entity being proximate to various objects in the environment. Alternatively, the initial approximations assign different likelihoods of an entity being proximate to different objects based on prior data describing similar environments or prior data describing the current environment.

In the example shown in FIG. 2, a first object 205A and a second object 205B from the initial description of the computing system 102 environment are shown for clarity. In other embodiments, more or fewer objects are included in the description of the environment surrounding the computing system 102. After the state generation module 142 identifies the first object 205A and the second object 205B from the received environment data, a region associated with each object is generated. Hence, a first region 210A is generated and associated with the first object 205A and a second region 210B is generated and associated with the second object 205B. Each of the regions defines a distribution over the position of an entity proximate to the object. Hence, the first region 210A describes a probability distribution of an entity being proximate to the first object 205A and the second region 210B indicates a probability distribution of an entity being proximate to the second object 205A. A two-dimensional mean vector, $\mu_r$ and a 2×2 covariance matrix $\Sigma_r$ are associated with each region specifying the characteristics of a Gaussian distribution associated with each region. The region-specific Gaussian distribution is used to determine the position of an entity with the region.

While the regions define regions where an entity is likely to reside, a position within the region more precisely indicates the location of an object within a region. Parameters of the position are dependent on characteristics of the region, such as the two-dimensional mean vector, $\mu_r$ and the 2×2 covariance matrix $\Sigma_r$ associated with each region. FIG. 2 shows the position of an entity within the first region 210A and the second region 210B. The first position 220A indicates the location of an entity within the first region 210A. The first position 320A comprises a variable drawn from the Gaussian distribution having the two-dimensional mean vector, $\mu_r$ and the 2×2 covariance matrix $\Sigma_r$ associated with the first region 210A. Similarly, the second position 220B comprises a variable drawn from the Gaussian distribution having the two-dimensional mean vector, $\mu_r$ and the 2×2 covariance matrix $\Sigma_r$ associated with the second region 210B.

In one embodiment, the region-based representation of entity location is implemented using a Dynamic Bayesian Network (DBN), allowing division of entity location information into two parts—one for modeling and another for decision-making. By using both a region and a position within a region to model entity position, entity transitions occurring at different time scales are separated into different layers of the entity position model, improving entity tracking over extended time intervals. For example, movement within a specific region is simplified by modeling movement using the Gaussian distribution associated with the specific region, simplifying entity tracking within a region. Using region based information simplifies decision-making by using easier to obtain information about the larger region including an entity rather than using exact information about the precise location of an entity. Further, using discrete regions allows entity tracking to be performed on a per-region basis, enabling more efficient and accurate tracking than a conventional particle filter.

Figure 3:
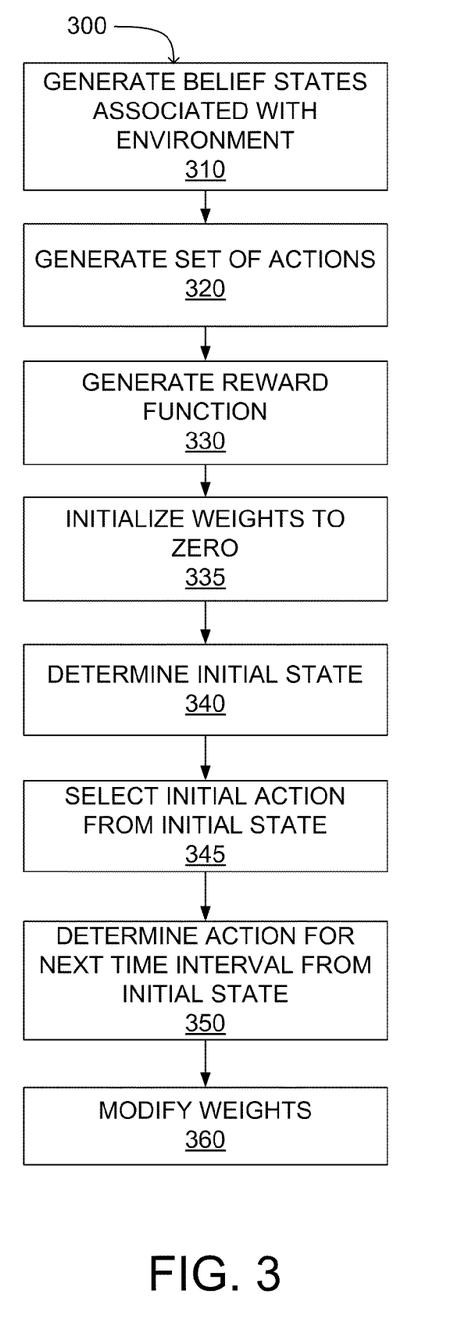
FIG. 3 is a flowchart illustrating a method for learning a task-level decision making policy by delaying a task learning step until receipt of an improved state estimate according to an embodiment of the present invention.

FIG. 3 is a flowchart illustrating a method 300 for learning a task-level decision making policy by delaying a task learning step according to an embodiment of the present invention. In an embodiment, the steps depicted in the method 300 shown in FIG. 3 are implemented by instructions for performing the described actions embodied or stored within a computer readable medium, e.g., memory 140, that are executable by a processor 110. Those of skill in the art will recognize that the method 300 may be implemented in embodiments of hardware and/or software or combinations thereof. Moreover, other embodiments can include different and/or additional steps than the ones shown in FIG. 3.

In an embodiment, the method 300 is included in the decision module 146 and determines an optimal policy, $\pi^*$, identifying actions to take at different states that arise, or may arise, during operation of the computing system 102. To determine the optimal policy, the method 300 modifies the weights of the parameterized form of the Q-function for different belief states, discussed above in conjunction with FIG. 1. Initially, a set of belief states are generated 310 by the state generation module 142 and communicated to the decision module 146. A belief state comprises a distribution over a set of states specifying the likelihood that an entity is in different states within the belief state. In addition to the belief states, a set of actions 320 are also generated 320, or specified, by the state generation module 142 and communicated to the decision module 146. One or more actions are associated with each state in the generated belief states, so that while in a state, the computing system 102 selects from one or more actions to perform using the policy generated by the decision module 146. Determining an optimal policy using the method 300 allows the decision module 146 to identify an optimal sequence of actions to accomplish a desired task.

The decision module 146 generates 330 a reward function representing the utility or desirability of a pairing of state, or belief state, and action. For example, the reward function associates a utility criterion or completion time with each pairing of state and action. In calculating the parameterized form of the Q-function, the decision module 146 uses the value of the reward function associated with different pairings of states and actions. In one embodiment, the Q-function for different belief states depends on the reward function as follows:

$$Q^\pi(b_t, a) = E_{s_t \sim b_t}[Q^\pi(s_t, a)]$$
$$= R(b_t, a) + \gamma E_{b_{t+1} \sim T(b_t, a, \cdot)}[V^\pi(b_{t+1})]$$

So that the reward function for the belief state associated with the current time interval and an action, $R(b_t, a)$, is added to the expected value of the policy associated with the belief state associated with the next time interval, determined by the transition probability, $V^\pi(b_{t+1})$ and attenuated by the discount factor to determine the Q-function value of a pairing of an action and the current belief state.

Once the belief states, actions and reward function are generated 310, 320, 330, the decision module 146 initializes 335 the weights of the parameterized form of the Q-function to zero and determines 340 an initial belief state for the computing system 102. In an embodiment, the initial belief state is specified by data from the state generation module 142 or from the observation module 144. Alternatively, the initial belief state is selected by the decision module 146, or determined 340 from data captured by the image capture device 105, input device 120 or other sensor included in the computing system 102.

From the initial belief state, the decision module 146 selects 345 an initial action. In an embodiment, the initial action is arbitrarily selected 345 from one or more actions associated with the initial belief state. Alternatively, the initial action is predetermined based on data from the input device 120 or communication module 150. As the belief state and action are changed during different time intervals, the initial belief state and initial action describe the initial environment of the computing system 102 during an initial time interval and the action to be performed by the computing system 102 during the initial time interval. As the time interval changes, the action and/or belief state are also modified to represent an updated state of the computing system 102 during a different time interval and an action to be performed by the computing system 102 during the different time interval. The decision module 146 accesses a policy to determine which action to take at different states arising during operation of the computing system 102, so the policy determines 350 an action associated with the next time interval based on the initial belief state.

In an embodiment, the action for execution during a subsequent time interval, such as the next time interval, is determined 350 by identifying an action associated with the current time interval having the largest Q-function value. For example, the action for the next time interval is determined 350 by determining 350 the action associated with the initial belief state resulting in the maximum Q-function value associated with the initial belief state. Similarly, during subsequent time intervals, the action associated with the belief state of the current time interval resulting in the maximum Q-function value associated with the current belief state determines the action for execution during the next time interval.

To improve the policy used for determination of the action to be executed during a subsequent time interval, the decision module 102 modifies 360 the weights of the parameterized form of the Q-function used to determine 350 the action for the next time interval using a predicted Q-function value associated with the belief state and action associated with the subsequent time interval. In one embodiment, a backup target value is determined from the subsequent time interval and used to adjust the policy after each time interval or transition between belief states. Modification of policy weights is further described below in conjunction with FIG. 4. Modifying 360 the weights of the parameterized form of the Q-function allows the computing system 102 to more efficiently learn a policy for accurately and quickly completing a task.

Figure 4:
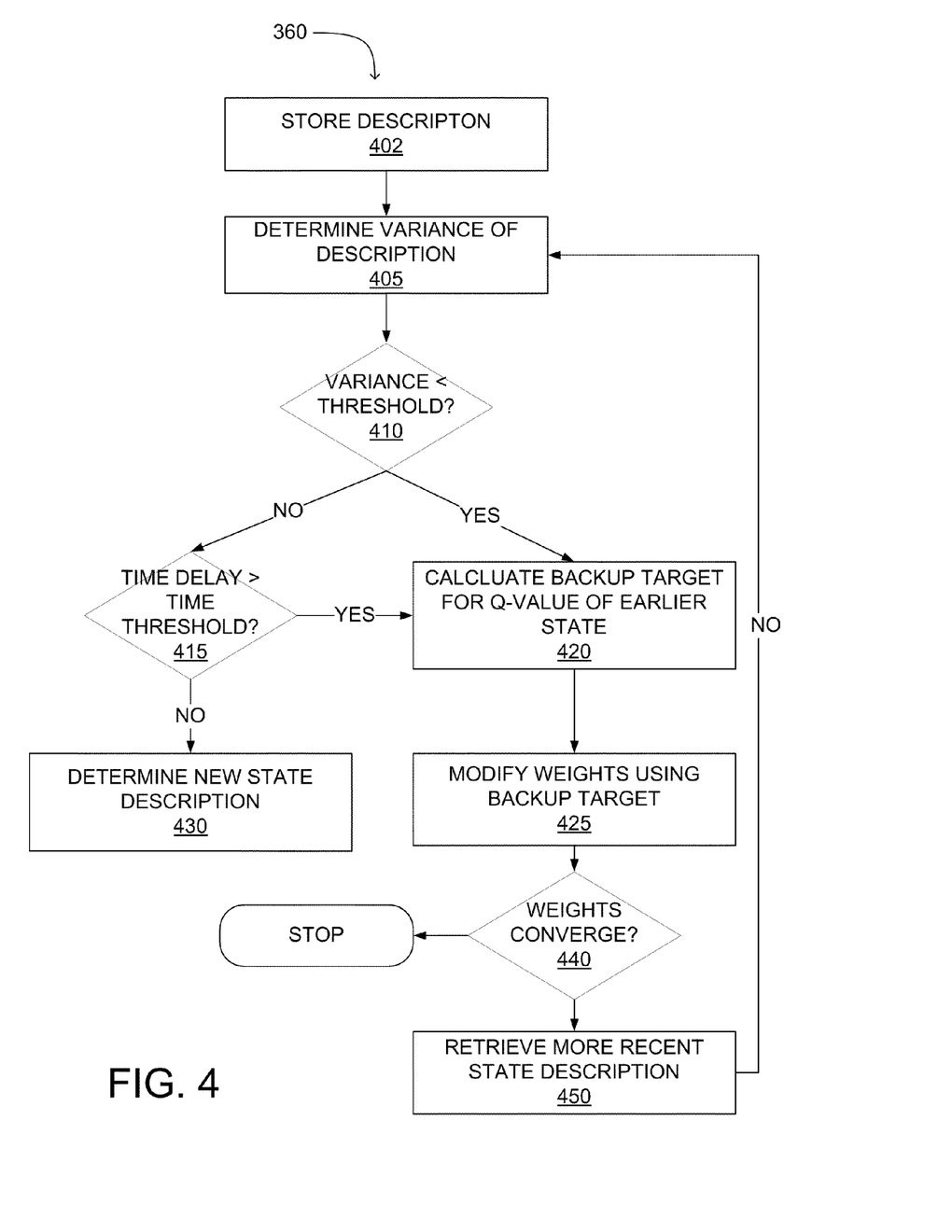
FIG. 4 is a flowchart of a method for updating the weights of a policy describing actions for performing a task according to an embodiment of the present invention.

FIG. 4 is a flowchart of a method for updating 360 the weights of a policy describing actions for performing a task according to an embodiment of the present invention. In an embodiment, the steps depicted in the method shown in FIG. 4 are implemented by instructions for performing the described actions embodied or stored within a computer readable medium, e.g., memory 140, that are executable by a processor 110. Those of skill in the art will recognize that the method may be implemented in embodiments of hardware and/or software or combinations thereof. Moreover, other embodiments can include different and/or additional steps than the ones shown in FIG. 4.

After the decision module 142 determines an action for the next time interval, as described above in conjunction with FIG. 3, but before moving to a new belief state, for example moving from the initial belief state to a new belief state or moving from the current belief state to a new belief state, a description of the state information is stored 402 by the decision module 146. In one embodiment, the description of the state information comprises an identification of the time interval, t, the belief state associated with the time interval, $b_t$, the action associated with the time interval, $a_t$, the reward function of the belief state and action pair associated with the time interval, $r_t$, and the action chosen by the current policy for execution in the next time interval, $a_{t+1}$. For example, the decision module 146 stores a tuple of the form $(t, b_t, a_t, r_t, a_{t+1})$ into a queue for subsequent retrieval of state information for a specified time interval. In an embodiment, a description of the state information is stored during each time interval, allowing the decision module 146 to maintain a history of the state information of the computing system 102 over time. In an embodiment, the description of the state information is stored 402 in a first-in, first-out queue included in the decision module 146.

To more rapidly learn an optimal policy, a revised Q-function value associated with the prior state is calculated using a predicted Q-function value for the current state, and the weights of the policy are modified by the decision module 146 based on the improved Q-function value. However, conventional methods update the Q-function value for a state associated a time interval based on the predicted Q-function value for the state associated with the next successive time interval. In such a conventional method, high uncertainty in the state estimate associated with the next successive time interval reduces the accuracy of the revised Q-function value associated with the earlier time interval, delaying determination of weights associated with an optimal policy.

To improve determination of the weights associated with the optimal policy, the decision module 146 determines 405 a variance of the stored state description, and uses the variance to determine when to modify a previously determined Q-function value. As the variance indicates the uncertainty of a state estimate, a smaller variance indicates a more accurate state estimate better suited for updating an earlier Q-function value. To identify an accurate state estimate, the decision module 146 determines 410 whether the variance of the stored state description is less than, or equal to, a threshold value. A state description having a variance that does not exceed the threshold value has an uncertainty low enough to accurately modify policy weights.

Therefore, if the decision module 146 determines 410 that the variance associated with a stored state description is below the threshold value, the decision module 146 calculates 420 a backup target using the stored state description. Hence, the decision module 146 delays modification of the policy weights based on the current state description until the uncertainty in the current state estimate is reduced. The backup target uses the belief distribution of the current state to compute an improved estimate of the belief distribution of a previous state. By delaying modification of a previous state Q-function value, the backup target uses the modified Q-function value of the previous state to more accurately predict a future Q-function value, improving the policy used to determine a sequence of actions.

Conventionally, methods calculated the backup target using:

$$\delta_t = r(b_t, a_t) + \gamma Q(b_{t+1}, a_{t+1}) - Q(b_t, a_t)$$

According to the conventional method, the backup target, $\delta_t$, for the belief state at the previous time interval $b_t$, is calculated by adding the reward function value for a pairing of belief state and action at the previous time interval, $r(b_t, a_t)$, and the predicted Q-function value for a pairing of belief state and action for the current time interval, which is consecutive to the previous time interval, $Q(b_{t+1}, a_{t+1})$ attenuated by the discount factor, $\gamma$, then subtracting the Q-function value for the pairing of belief state and action at the previous time interval, $Q(b_t, a_t)$. However, this conventional backup target calculation is based on using the predicted Q-function value of the current time interval to modify the Q-function value of the state-action pair from the immediately prior time interval. To improve accuracy, the backup target is not calculated 420 until the uncertainty in the current state estimate is reduced, which may result in multiple time intervals elapsing between the state estimate used to calculate 420 the backup target and the prior state estimate modified by the backup target.

Hence, calculation 420 of the backup target is delayed until a later time interval when the uncertainty in the current state estimate is reduced to more accurately update the Q-function value for an earlier time interval. To account for the time intervals elapsing between the state estimate used to calculate 420 the backup target and the prior state estimate modified by the backup target, the decision module 146 calculates 420 the backup target using:

$$\delta_t^{t+k} = r(b_t, a_t) + \gamma Q(b_{t+1}^{t+k}, a_{t+1}) - Q(b_t, a_t)$$

where, $$b_{t+1}^{t+k} = Pr(s_{t+1} | b_{t+k})$$

So, the calculated backup target is the sum of the reward function value for a pairing of belief state and action at the previous time interval, $r(b_t, a_t)$, and the predicted Q-function value for a pairing of belief distribution over the state during the time interval following the previous time interval ($s_{t+1}$) conditioned on the belief state at the current time interval ($b_{t+k}$), $Q(b_{t+1}, a_{t+1})$ attenuated by the discount factor, $\gamma$, less the Q-function value for the pairing of belief state and action at the previous time interval, $Q(b_t, a_t)$.

To infer the belief state associated with the time interval following the previous time interval from the belief state at the current time interval ($b_{t+k}$), the decision module 146 retrieves values of the region variable associated with the belief state from the tracking module 145. In addition to storing particles maintaining a history of a region variable, the tracking module 145 re-weights particles by their likelihood so that the particle density at a particular time interval reflects the posterior distribution conditioned on prior observations by the tracking module. This re-weighting of particles allows determination of the smoothed belief for each entity using:

$$b_{t+1}^{t+k}(r) \approx \sum_{p_i \in P_{t+k}} I(p_i, r_{t+1} == r)$$

Where I denotes the indicator function. The belief state associated with the time interval following the previous time interval conditioned on the belief state at the current time interval is then the product of the smoothed belief of each entity.

The backup target is then used to modify 425 weights of the parameterized form of the Q-function as follows:

$$w \leftarrow w + \alpha \delta_t^{t+k} \nabla_w Q(b_t, a_t)$$

Where $\alpha$ is a learning rate initially set to a small value and decreased as time intervals elapse and $\nabla_W$ is the gradient of $Q(b_t, a_t)$ with respect to the weights, w, which comprises a vector of partial derivatives of $Q(b_t, a_t)$ with respect to w. The weights are modified 425 until they converge, which indicates that the optimal policy has been determined. Delaying calculation 420 of the backup target and modification 425 of the policy weights until a time interval when uncertainty in the current state estimate is reduced, causes the policy weights to converge faster, reducing the time for determining the optimal policy. For example, in a delivery task, after the computing system 102 retrieves an object and begins determining a move action in the time interval after retrieving the object, the computing system 102 has limited information about entity locations. Because of the limited location information, the computing system 102 determines the move action using an expectation of object location, which may significantly differ from actual object location. Hence, delaying backup target calculation 420 until object location is determined improves backup target accuracy and reduces the time for learning the optimal policy.

In addition to determining 410 that the variance of the stored state description exceeds the threshold value, the decision module 146 determines 415 whether a time delay associated with the stored state description exceeds a delay threshold. If the time delay exceeds the delay threshold, the backup target is calculated 420 using the stored state description as described above. However, if the time delay does not exceed the delay threshold, a state description is determined 430 for the next time interval. Maintaining a time delay allows the decision module 146 to place an upper limit on the number of time intervals elapsing between modification 425 of the policy weights, even if the variance of later state descriptions does not fall below the threshold value.

After modifying the weights based on the calculated backup target, the decision module 146 determines 440 whether the weights of the parameterized form of the Q-function have converged. If the weights of the parameterized form of the Q-function converge, the decision module 146 determines that the modified weights represent a policy substantially similar to the optimal policy achievable with the particular choice of feature functions in the policy representation, indicated by $\phi$, so modification of the weights is stopped. However, if the weights of the parameterized form of the Q-function do not converge, a state description associated with a more recent time interval is retrieved 450 by the decision module 146. For example, the decision module 146 retrieves 450 a more recently stored sate description from a first-in, first-out queue. The variance of the retrieved state description is determined 405, and the method described above is repeated for the retrieved state description.

Figure 5:
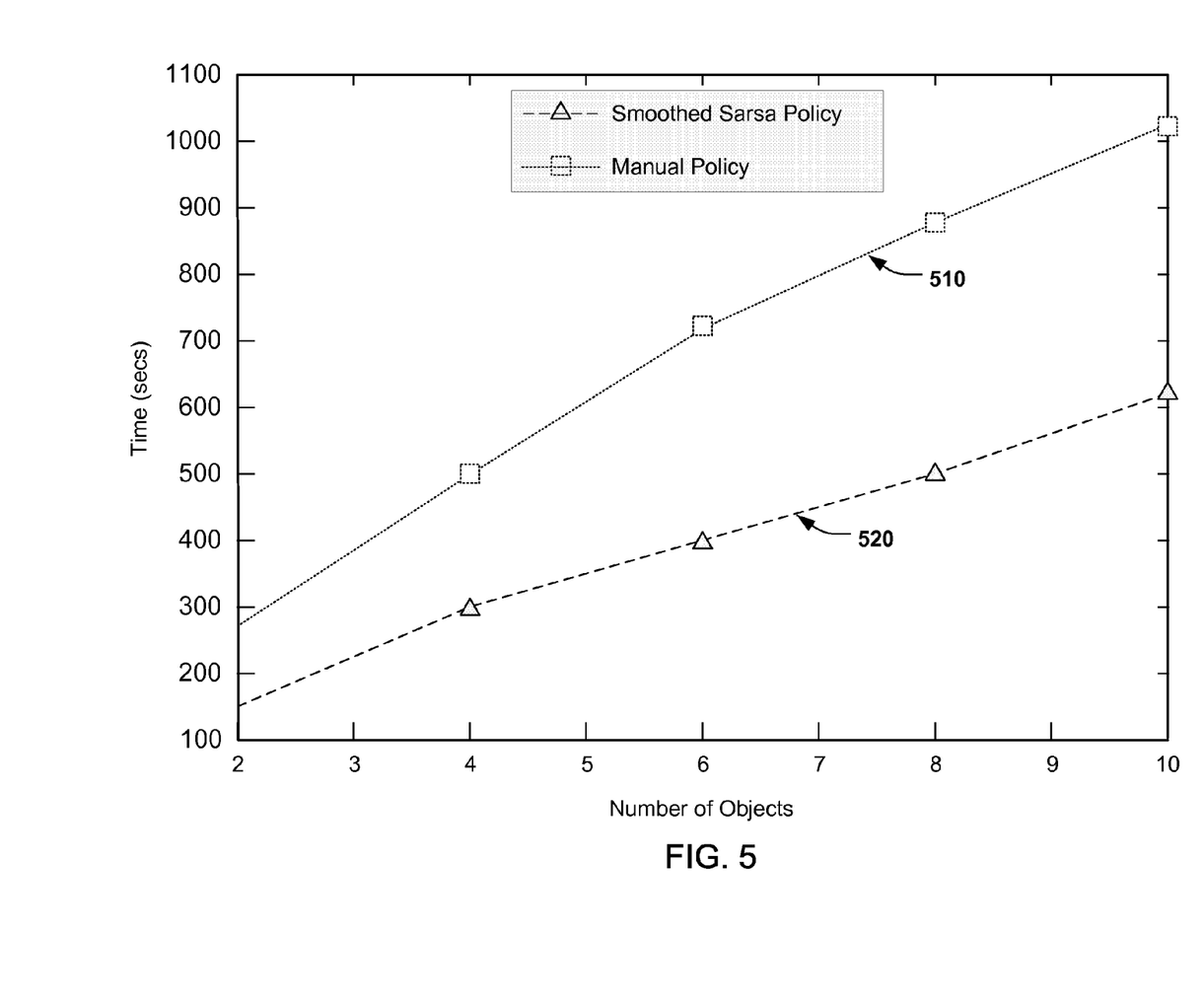
FIG. 5 is an illustration of the average completion time of automated delivery tasks according to one embodiment of the present invention.

FIG. 5 is an illustration of the mean completion time of automated delivery tasks according to one embodiment of the present invention. In FIG. 5, the mean completion time of delivery tasks using a manually encoded policy to the mean completion time of delivery tasks using a reinforcement learning method where the backup of Q-function values is delayed until the variance of a state estimate is below a threshold value. FIG. 5 compares the mean time to complete delivery tasks averaged over 100 trials for the manually encoded policy 510 and for a policy learned by reinforcement learning method where the backup of Q-function values is delayed until the variance of a state estimate is below a threshold value 520. As shown in FIG. 5, learning the policy using reinforcement learning and delaying Q-function value backup consistently results in faster completion of delivery tasks.

To further illustrate how delaying Q-function value backup until the variance of a state estimate is below a threshold, consider multiple-object, multiple-person delivery scenarios in a multiple-room environment. In the delivery scenarios, actions available to the computing system 102 in the example shown in FIG. 5 are: (a) move towards a region, x, for a specified number of seconds, t; (b) pickup an object, o, from a region, x; (c) deliver currently held object to a person, p, in a region, x. The computing system 102 receives a reward for completing each task that is proportional to the priority of completing the task. Additionally, the feature vector, $\phi$, used in the parameterized representation of the Q-function include feature functions encoding properties of the state and action such as the probability that an entity, such as an object, person or obstacle, is in a region, distance to an entity within a region, whether different regions are visible to the computing system 102.

When a manually-encoded policy is used to complete one of the multiple-object, multiple-person scenarios, the computing system 102 performs each task in the order of priority and visits regions in order of maximum likelihood when searching for an entity. Also, when using the manually-encoded policy, the computing system 102 begins looking for a first object and does not switch tasks even when a different object is detected before the first object. This inability to switch between tasks causes the computing system 102 to move between regions more than necessary to complete tasks. However, when using the policy learned using delayed Q-function value backup, the computing system 102 performs actions having the highest probability of completing a task, even if the task completed is of a lower priority than the remaining tasks.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for learning a policy for performing a task by a computing system, the method comprising the steps of:
   determining, by the computing system, a first state associated with a first time interval;
   determining, by the computing system, a subsequent state associated with a subsequent time interval;
   determining, by the computing system, a first action from the first state using the policy, which comprises a plurality of weights, properties of one or more actions and properties of one or more states;
   determining, by the computing system, a subsequent action from the subsequent state using the policy;
   determining, by the computing system, a reward value associated with a combination of the first state and the first action;
   storing, by the computing system, a state description including the first state, the first action, the subsequent state, the subsequent action and the reward value in a non-transitory computer-readable storage medium;
   responsive to a time delay between the first time interval and a current time interval associated with a current state exceeding a delay threshold value or a variance associated with the subsequent state stored in the state description not exceeding a variance threshold value at the current state, calculating, by the computing system, a backup target from the state description;

modifying, by the computing system, one or more weights of the plurality of weights responsive to the backup target; and deleting, by the computing system, the state description from the non-transitory computer-readable storage medium.

2. The computer-implemented method of claim 1, wherein the backup target is calculated in response to
a variance associated with the subsequent state stored in the state description not exceeding a variance threshold value at a current state.

3. The computer-implemented method of claim 1, wherein the backup target is calculated in response to
a time delay between the first time interval and a current time interval associated with a current state exceeding a delay threshold value.

4. The computer-implemented method of claim 1, further comprising the step of:
responsive to determining the one or more weights included in the policy modified responsive to the backup target converge to a value, storing the policy in a computer-readable storage medium.

5. The computer-implemented method of claim 1, further comprising the step of:
responsive to determining the one or more weights included in the policy modified responsive to the backup target do not converge to a value, determining a second state associated with a second time interval;
determining a current action from the current state using the policy;
determining a second action from the second state using the policy;
determining a current reward value associated with a combination of the current state and the current action;
storing a second state description including the current state, the current action, the second state, the second action and the current reward value;
responsive to a second time delay between the current time interval and an additional time interval associated with an additional state exceeding the delay threshold value or a variance associated with the second state stored in the second state description not exceeding the variance threshold value at the additional state, calculating a second backup target from the second state description;
modifying one or more weights included in the policy responsive to the second backup target; and
deleting the second state description.

6. The computer-implemented method of claim 1, wherein calculating the backup target from the state description comprises the steps of:
generating a predicted Q-function value associated with the subsequent state stored in the state description and the subsequent action stored in the state description;
attenuating the predicted Q-function value by a discount factor;
generating a sum of the reward value and the predicted Q-function value; and
subtracting a Q-function value associated with the first state stored in the state description and the first action stored in the state description from the sum.

7. The computer-implemented method of claim 6, wherein the predicted Q-function value is dependent upon a probability distribution over the current state.

8. The computer-implemented method of claim 7, wherein the probability distribution over the current state is conditioned on additional stored state descriptions associated with time intervals occurring between the first time interval and the current time interval.

9. The computer-implemented method of claim 1, wherein modifying one or more weights included in the policy responsive to the backup target comprises the steps of:
generating a gradient at a current weight of a Q-function value associated with the combination of the first state and the first action;
determining a product of the gradient, the backup target and a learning rate;
generating a modified weight by computing a sum of the product and the current weight; and
storing the modified weight.

10. The computer-implemented method of claim 9, wherein the learning rate comprises a value that is decreased as time intervals elapse.

11. The computer-implemented method of claim 9, wherein the Q-function value comprises a weighted sum of feature functions identifying properties of a state and an action multiplied by one or more weights.

12. A computer program product comprising a non-transitory computer readable storage medium storing computer executable code for learning a policy for performing a task by a computing system, the computer executable code performing the steps of:
determining a first state associated with a first time interval;
determining a subsequent state associated with a subsequent time interval;
determining a first action from the first state using the policy, which comprises a plurality of weights, properties of one or more actions and properties of one or more states;
determining a subsequent action from the subsequent state using the policy;
determining a reward value associated with a combination of the first state and the first action;
storing a state description including the first state, the first action, the subsequent state, the subsequent action and the reward value;
responsive to a time delay between the first time interval and a current time interval associated with a current state exceeding a delay threshold value or a variance associated with the subsequent state stored in the state description not exceeding a variance threshold value at the current state, calculating a backup target from the state description;
modifying one or more weights included in the policy responsive to the backup target; and deleting the state description.

13. The computer program product of claim 12, wherein the backup target is calculated in response to
a variance associated with the subsequent state stored in the state description not exceeding a variance threshold value at a current state.

14. The computer program product of claim 12, wherein the backup target is calculated in response to
a time delay between the first time interval and a current time interval associated with a current state exceeding a delay threshold value.

15. The computer program product of claim 12, further comprising the step of:
responsive to determining the one or more weights included in the policy modified responsive to the backup target converge to a value, storing the policy in a computer-readable storage medium.

16. The computer program product of claim 12, further comprising the steps of:
responsive to determining the one or more weights included in the policy modified responsive to the backup target do not converge to a value, determining a second state associated with a second time interval;
determining a current action from the current state using the policy;
determining a second action from the second state using the policy;
determining a current reward value associated with a combination of the current state and the current action;
storing a second state description including the current state, the current action, the second state, the second action and the current reward value;
responsive to a second time delay between the current time interval and an additional time interval associated with an additional state exceeding the delay threshold value or a variance associated with the second state stored in the second state description not exceeding the variance threshold value at the additional state, calculating a second backup target from the second state description;
modifying one or more weights included in the policy responsive to the second backup target; and
deleting the second state description.

17. The computer program product of claim 12, further comprising the steps of:
generating a predicted Q-function value associated with the subsequent state stored in the state description and the subsequent action stored in the state description;
attenuating the predicted Q-function value by a discount factor;
generating a sum of the reward value and the predicted Q-function value; and
subtracting a Q-function value associated with the first state stored in the state description and the first action stored in the state description from the sum.

18. The computer program product of claim 17, wherein the predicted Q-function value is dependent upon a probability distribution over the current state.

19. The computer program product of claim 18, wherein the probability distribution over the current state is conditioned on additional stored state descriptions associated with time intervals occurring between the first time interval and the current time interval.

20. The computer program product of claim 12, wherein modifying one or more weights included in the policy responsive to the backup target comprises the steps of:
generating a gradient at a current weight of a Q-function value associated with the combination of the first state and the first action;
determining a product of the gradient, the backup target and a learning rate;
generating a modified weight by computing a sum of the product and the current weight; and
storing the modified weight.

21. The computer program product of claim 20, wherein the learning rate comprises a value that is decreased as time intervals elapse.

22. The computer program product of claim 20, wherein the Q-function value comprises a weighted sum of feature functions identifying properties of a state and an action multiplied by one or more weights.

23. A computing system for learning a policy for performing a task comprising:
a non-transitory computer-readable storage medium containing executable computer instructions comprising:
a state generation module configured to determine a first state associated with a first time interval and to determine a subsequent state associated with a subsequent time interval;
a decision module, coupled to the state generation module, configured to determine a first action from the first state using the policy, which comprises a plurality of weights, properties of one or more actions and properties of one or more states, to determine a subsequent action from the subsequent state using the policy, to determine a reward value associated with a combination of the first state and the first action and to store a state description including the first state, the first action, the subsequent state, the subsequent action and the reward value; and
an observation module, coupled to the decision module, configured to determine a position of the computing system using a localization process, and to determine a position of one or more entities external to the computing system, the position of the computing system and the position of the one or more entities used by the decision module in determining the subsequent action;
wherein, in response to a time delay between the first time interval and a current time interval associated with a current state exceeding a delay threshold value or to a variance associated with the subsequent state stored in the state description not exceeding a variance threshold value at the current state, the decision module is further configured to calculated a backup target from the state description, to modify one or more weights included in the policy responsive to the backup target, and to delete the state description; and
a processor configured to execute the computer instructions.

24. The computing system of claim 23, wherein the decision module
calculates a backup target from the state description responsive to a variance associated with the subsequent state stored in the state description not exceeding a variance threshold value at a current state.

25. The computing system of claim 23, wherein the decision module
calculates a backup target from the state description responsive to a time delay between the first time interval and a current time interval associated with a current state exceeding a delay threshold value.

26. The computing system of claim 23, wherein the decision module is further configured to:
store the policy responsive to determining that the one or more weights included in the policy modified responsive to the backup target converge to a value.

27. The computing system of claim 23, wherein:
the state generation module is further configured to determine a second state associated with a second time interval responsive to the decision module determining that the one or more weights included in the policy modified responsive to the backup target do not converge to a value; and
the computing decision module, responsive to determining the one or more weights included in the policy modified responsive to the backup target do not converge to a value, is further configured to determine a current action from the current state using the policy, to determine a second action from the second state using the policy, to determine a current reward value associated with a combination of the current state and the current action and to store a second state description including the current state, the current action, the second state, the second action and the current reward value.

28. The computing system of claim 27, wherein the decision module is further configured to:
calculate a second backup target from the second state description, modify one or more weights included in the policy responsive to the second backup target, and delete the second state description responsive to a second time delay between the current time interval and an additional time interval associated with an additional state exceeding the delay threshold value or a variance associated with the second state stored in the second state description not exceeding the variance threshold value at the additional state.

29. The computing system of claim 23, wherein the decision module calculates the backup target from the stored state description by:
generating a predicted Q-function value associated with the subsequent state stored in the state description and the subsequent action stored in the state description;
attenuating the predicted Q-function value by a discount factor;
generating a sum of the reward value and the predicted Q-function value; and
subtracting a Q-function value associated with the first state stored in the state description and the first action stored in the state description from the sum.

30. The computing system of claim 29, wherein the predicted Q-function value is dependent upon a probability distribution over the current state.

31. The computing system of claim 30, wherein the probability distribution over the current state is conditioned on additional stored state descriptions associated with time intervals occurring between the first time interval and the current time interval.

32. The computing system of claim 23, wherein the decision module modifies one or more weights included in the policy associated with the first state responsive to the backup target calculated from the stored state description by:
generating a gradient at a current weight of a Q-function value associated with the combination of the first state and the first action;
determining a product of the gradient, the backup target and a learning rate;
generating a modified weight by computing a sum of the product and the current weight; and
storing the modified weight.

33. The computing system of claim 32, wherein the learning rate comprises a value that is decreased as time intervals elapse.

34. The computing system of claim 32, wherein the Q-function value comprises a weighted sum of feature functions identifying properties of a state and an action multiplied by one or more weights.

\* \* \* \* \*